US008972873B2

(12) United States Patent
Gerken, III et al.

(10) Patent No.: US 8,972,873 B2
(45) Date of Patent: Mar. 3, 2015

(54) MULTI-ENVIRONMENT WIDGET ASSEMBLY, GENERATION, AND OPERATION

(75) Inventors: John Kenyon Gerken, III, Apex, NC (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/957,002

(22) Filed: Nov. 30, 2010

(65) Prior Publication Data
US 2012/0137227 A1    May 31, 2012

(51) Int. Cl.
*G06F 3/00*        (2006.01)
*G06F 9/44*        (2006.01)

(52) U.S. Cl.
CPC .................................. *G06F 8/38* (2013.01)
USPC .......................... 715/762; 715/747

(58) Field of Classification Search
CPC ............ G05B 2219/23246; G05B 2219/23247
USPC .................................. 715/747, 762
See application file for complete search history.

(56) References Cited

U.S. PATENT DOCUMENTS

| | | | | |
|---|---|---|---|---|
| 6,208,340 B1 * | 3/2001 | Amin et al. | ..................... | 715/808 |
| 6,523,027 B1 * | 2/2003 | Underwood | .......................... | 1/1 |
| 7,030,890 B1 * | 4/2006 | Jouet et al. | ..................... | 345/619 |
| 7,100,195 B1 * | 8/2006 | Underwood | ....................... | 726/2 |
| 7,107,526 B1 * | 9/2006 | Weller | .......................... | 715/206 |
| 7,392,483 B2 * | 6/2008 | Wong et al. | .................... | 715/746 |
| 7,505,817 B2 * | 3/2009 | McDaniel et al. | ............... | 700/18 |
| 7,634,722 B2 * | 12/2009 | Barnett | .......................... | 715/239 |
| 7,805,746 B2 * | 9/2010 | Brandyberry et al. | ........ | 725/110 |
| 7,895,522 B2 * | 2/2011 | Wong et al. | .................... | 715/746 |
| 8,056,092 B2 * | 11/2011 | Allen et al. | ..................... | 719/320 |
| 8,150,939 B1 * | 4/2012 | Murray | .......................... | 709/217 |
| 8,234,622 B2 * | 7/2012 | Meijer et al. | ..................... | 717/104 |
| 8,266,274 B2 * | 9/2012 | Allen et al. | ..................... | 709/224 |
| 8,321,803 B2 * | 11/2012 | Benedetti et al. | ............. | 715/769 |
| 8,370,826 B2 * | 2/2013 | Johnson et al. | ............... | 717/168 |
| 8,458,605 B2 * | 6/2013 | Klask et al. | .................... | 715/763 |
| 8,479,108 B2 * | 7/2013 | Yuen et al. | ..................... | 715/762 |
| 8,578,330 B2 * | 11/2013 | Dreiling et al. | ............... | 717/108 |
| 8,849,612 B2 * | 9/2014 | Slothouber et al. | ........... | 702/182 |
| 2002/0049788 A1 * | 4/2002 | Lipkin et al. | .................. | 707/513 |
| 2002/0073236 A1 | 6/2002 | Helgeson et al. | | |
| 2003/0037076 A1 * | 2/2003 | Bravery et al. | ............... | 707/517 |

(Continued)

OTHER PUBLICATIONS

Frank Castaneda et al., Plants by WebSphere gets a Web 2.0 makeover, IBM WebSphere Developer Technical Journal, May 14, 2008, pp. 1-21, U.S.

(Continued)

*Primary Examiner* — Shen Shiau
(74) *Attorney, Agent, or Firm* — Grasso PLLC; Fred Grasso

(57) ABSTRACT

Widget creation, editing, augmentation, tracking and deployment is provided. Embodiments may include a Widget Assembly Application ("WAA"). The WAA may employ generalized widget templates selected by a user for customizing or assembling widgets. A generator may render previously assembled widgets when requested. The generator may use a skeleton specific to the target server type and widget, and code supporting the generator and the WAA may employ recursive eye-catcher syntax. Widgets may be deployed from any discovered instance to additional remote widget containers of the same or different type.

21 Claims, 10 Drawing Sheets

(56) References Cited

U.S. PATENT DOCUMENTS

| | | | |
|---|---|---|---|
| 2003/0067485 A1* | 4/2003 | Wong et al. | 345/747 |
| 2003/0070061 A1* | 4/2003 | Wong et al. | 712/220 |
| 2004/0264782 A1* | 12/2004 | McKnight et al. | 382/229 |
| 2004/0267515 A1* | 12/2004 | McDaniel et al. | 703/22 |
| 2005/0086587 A1* | 4/2005 | Balz | 715/505 |
| 2005/0183009 A1* | 8/2005 | Hannebauer et al. | 715/517 |
| 2005/0193368 A1* | 9/2005 | Becker et al. | 717/106 |
| 2005/0262196 A1* | 11/2005 | Mueller | 709/203 |
| 2006/0015846 A1* | 1/2006 | Fraleigh et al. | 717/109 |
| 2006/0031918 A1* | 2/2006 | Sarachik et al. | 725/138 |
| 2006/0130120 A1* | 6/2006 | Brandyberry et al. | 725/136 |
| 2006/0168526 A1* | 7/2006 | Stirbu | 715/740 |
| 2006/0179118 A1* | 8/2006 | Stirbu | 709/217 |
| 2006/0206804 A1* | 9/2006 | Barnett | 715/513 |
| 2006/0277469 A1* | 12/2006 | Chaudhri et al. | 715/709 |
| 2007/0011620 A1* | 1/2007 | Mendel et al. | 715/762 |
| 2007/0038934 A1* | 2/2007 | Fellman | 715/700 |
| 2007/0061724 A1* | 3/2007 | Slothouber et al. | 715/716 |
| 2007/0101279 A1* | 5/2007 | Chaudhri et al. | 715/762 |
| 2008/0010609 A1 | 1/2008 | Curtis et al. | |
| 2008/0082627 A1* | 4/2008 | Allen et al. | 709/217 |
| 2008/0091777 A1 | 4/2008 | Carlos | |
| 2008/0148283 A1* | 6/2008 | Allen et al. | 719/316 |
| 2008/0163081 A1* | 7/2008 | Gillette et al. | 715/762 |
| 2008/0168185 A1* | 7/2008 | Robbin et al. | 709/248 |
| 2008/0195483 A1* | 8/2008 | Moore | 705/14 |
| 2008/0195961 A1* | 8/2008 | Bae et al. | 715/769 |
| 2008/0215879 A1 | 9/2008 | Williams et al. | |
| 2008/0215998 A1* | 9/2008 | Moore et al. | 715/762 |
| 2008/0222232 A1* | 9/2008 | Allen et al. | 709/201 |
| 2008/0222613 A1* | 9/2008 | Allen et al. | 717/128 |
| 2008/0229280 A1* | 9/2008 | Stienhans | 717/107 |
| 2008/0307385 A1* | 12/2008 | Dreiling et al. | 717/108 |
| 2009/0063502 A1* | 3/2009 | Coimbatore et al. | 707/10 |
| 2009/0064017 A1* | 3/2009 | Biniak et al. | 715/764 |
| 2009/0094339 A1* | 4/2009 | Allen et al. | 709/206 |
| 2009/0100329 A1* | 4/2009 | Espinoza | 715/234 |
| 2009/0216634 A1* | 8/2009 | Peltonen et al. | 705/14 |
| 2009/0222368 A1* | 9/2009 | McCauley et al. | 705/35 |
| 2009/0249282 A1* | 10/2009 | Meijer et al. | 717/104 |
| 2009/0260022 A1 | 10/2009 | Louch et al. | |
| 2009/0282125 A1* | 11/2009 | Jeide et al. | 709/217 |
| 2009/0307661 A1* | 12/2009 | Vierzba et al. | 717/120 |
| 2009/0319951 A1* | 12/2009 | Benedetti et al. | 715/837 |
| 2009/0328025 A1* | 12/2009 | Johnson et al. | 717/170 |
| 2010/0031171 A1 | 2/2010 | Zhang et al. | |
| 2010/0064233 A1* | 3/2010 | Dewar et al. | 715/760 |
| 2010/0070886 A1* | 3/2010 | Poulsen et al. | 715/760 |
| 2010/0071026 A1* | 3/2010 | Poulsen et al. | 726/1 |
| 2010/0095233 A1* | 4/2010 | Skourup et al. | 715/771 |
| 2010/0100626 A1* | 4/2010 | Allen et al. | 709/227 |
| 2010/0153865 A1* | 6/2010 | Barnes et al. | 715/762 |
| 2010/0169755 A1* | 7/2010 | Zafar et al. | 715/205 |
| 2010/0180194 A1* | 7/2010 | Ji et al. | 715/234 |
| 2010/0235766 A1* | 9/2010 | Fujioka | 715/762 |
| 2011/0016000 A1* | 1/2011 | Cronshaw et al. | 705/14.55 |
| 2011/0022630 A1* | 1/2011 | Madishetty | 707/770 |
| 2011/0066477 A1* | 3/2011 | Fujioka | 705/14.4 |
| 2011/0067003 A1* | 3/2011 | Slothouber et al. | 717/120 |
| 2011/0099487 A1* | 4/2011 | Pyhalammi et al. | 715/762 |
| 2011/0107227 A1* | 5/2011 | Rempell et al. | 715/738 |
| 2011/0136569 A1* | 6/2011 | Gura | 463/29 |
| 2011/0145782 A1* | 6/2011 | Brukner et al. | 717/104 |
| 2011/0178866 A1* | 7/2011 | Levine et al. | 705/14.43 |
| 2011/0214078 A1* | 9/2011 | Klask et al. | 715/763 |
| 2011/0289428 A1* | 11/2011 | Yuen et al. | 715/752 |
| 2011/0289437 A1* | 11/2011 | Yuen et al. | 715/762 |
| 2012/0010995 A1* | 1/2012 | Skirpa et al. | 705/14.49 |
| 2012/0069131 A1* | 3/2012 | Abelow | 348/14.01 |
| 2012/0096041 A1* | 4/2012 | Rao et al. | 707/794 |
| 2012/0110480 A1* | 5/2012 | Kravets | 715/760 |
| 2012/0137227 A1* | 5/2012 | Gerken et al. | 715/747 |
| 2012/0179987 A1* | 7/2012 | Mohan et al. | 715/762 |
| 2013/0268437 A1* | 10/2013 | Desai et al. | 705/41 |
| 2013/0339232 A1* | 12/2013 | Desai et al. | 705/41 |

OTHER PUBLICATIONS http://togo.ebay.com/create/, Date Printed Nov. 11, 2010, p. 1.
http://www.widgetbox.com/, Date Printed Nov. 11, 2010, pp. 1-2.
mhtml:file://C:\Documents and Settings\Administrator\Plants by Websphere gets a Web 2_0 makeover.mht, Same as Frank Castaneda et. al.
http://www.springwidgets.com/, Date Printed Nov. 11, 2010, pp. 1-2.

\* cited by examiner

MULTI-ENVIRONMENT WIDGET ASSEMBLY, GENERATION, AND OPERATION

BACKGROUND

The present invention relates to widgets and more particularly to the creation, assembly, editing, and generation of customizable, flexible, and multi-environment widgets.

A widget example may include code that serves to sit atop a user's desktop, instantiates HTML, and renders the content. When content is from the Internet, a widget can render a URL embedded in the widget. For example, when the Internet content is weather from a weather tracking website, current and forecasted weather from that website may be displayed in the widget's content area at a user's desktop.

Widget editors may employ graphic interfaces that a user may interface with when choosing or editing widgets. These editors can serve to create widgets and to edit widgets that a user has previously created. Examples of widget editors include: eBay To Go (http://togo.ebay.com/create/), WidgetBox (http://www.widgetbox.com/), and Spring Widget (http//:www.springwidgets.com/).

BRIEF SUMMARY

Widget creation and editing is provided. Embodiments may include a Widget Assembly Application ("WAA") that can be locally implemented, server-based, client-based, and implemented over a network. The WAA may employ generalized widget templates loaded or created by an administrator. These generalized templates may be selected by an end user of the WAA and may be customized using tools of the WAA. A customized and specialized widget may be saved as a specific widget instance embodying the edits and customization selected by a user as well as a combination of users and administrators.

In embodiments, customized widget instances may be rendered in various different environments. For example, in embodiments, when a widget is deployed to a target, part of that deployment may include metadata that identifies the target type, for instance, Google Wave, vs. Facebook, vs. IBM Mashup Center. That metadata may then be forwarded back to the generator in the invoking URL and used to select the appropriate skeleton. In embodiments, the generator may use an environment skeleton specific to the target environment and responsive to the widget format of the widget instance saved by the user. In embodiments, updating environment skeletons can serve to update widgets previously rendered with the skeleton as well as those yet to be rendered. Thus, in embodiments, the use of an environmental skeleton as framework for generating widgets can facilitate global changes across many rendered widgets.

In embodiments, rendered widgets may also be constructed in a fashion that enables the widget to interact with other widgets in the deployed environment. This flexibility may be accomplished by building eventing constructs as associated artifacts into environmental skeletons used to render the widgets. Other methods may be used as well.

In embodiments, code used for instantiating the WAA, performing widget edits with the WAA, or performing other operations may also include a recursive eye-catcher syntax. This syntax may include specialized eye-catcher symbols in the code to implement dynamic operations or embed reusable code components. In so doing, the eye-catchers may allow values originating elsewhere to appear in the finished widget output and, in embodiments, these values can be dynamically calculated.

Embodiments may also include a container, wrapper, or other packaging construct that allows or enables remotely hosted widgets to become compatible with platforms other than those for which they were initially created for. The wrapper function may allow the wrapped widget to receive content from other previously incompatible widgets as well as to receive edits or other changes from the user. Thus, the previously incompatible widget may be wrapped and, thereby, become compatible with other containers, widgets, or mashup content. Still further applications of the wrapped widgets may be plausible as well.

Embodiments may be used as a stand-alone application, device, process or article of manufacture. Embodiments may also be bundled with other applications, devices, processes and articles of manufacture. This bundling may include use with IBM Mashup Center™ as well as with email providers, instant messaging providers, and other applications and providers.

In so doing, embodiments may enable business end users to create functional widgets out of existing web content, existing widgets of different formats and data they have access to. An example would include a widget that provides the real-time location of reporters in the field. In other words, end users may identify material on the Internet or their enterprise and then be able to re-task it into a form useable to them, e.g., pulling content into other repositories and retasking it as needed.

DETAILED DESCRIPTION

Figure 1:
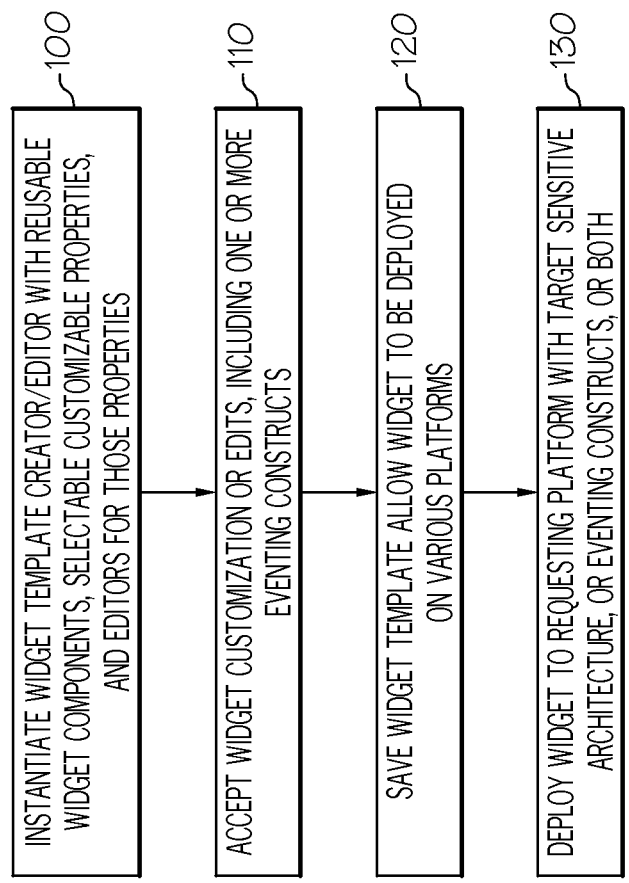
FIG. 1 shows features of a process as may be employed in accord with embodiments.

Embodiments of the invention may facilitate the creation or editing of widgets. This can include providing a Widget Assembly Application ("WAA") or other system for an end user, programmer, or administrator, to create, edit, or otherwise customize widgets. The WAA or other system can include widget templates, reusable widget components, specialized architectures, widget wrappers or containers, code eye-catchers, widget environment skeletons, and other techniques and customizable properties, to create or edit widgets. The WAA or other embodiments of the invention may also accommodate various widget APIs for instantiating widgets in multiple environments. The WAA may function by selectively incorporating HTML, CSS, JavaScript, Dojo, Java Applets, Flash, and web browser technologies into generated widgets such that a generated and instantiated widget may exist and be functional in various environments, e.g., browsers, operating systems, devices, and platforms. Embodiments may also be able to create, in real-time, widgets that are customized from a specific target.

Embodiments may include coded templates that can serve as a basis for an end-user to assemble and edit a widget. Some examples of generalized widget templates that may be created include: a topic reader for a blog feed, a chart that displays data from a feed containing numeric content, and a map that renders address data. In embodiments, a web user interface or local application may allow a user to select a template from a list, customize it by interacting with real-time property editors, save the finished widget instance, and deploy it to a specified location. In embodiments, the architecture used to render the widgets may be target sensitive. For example, embodiments may include skeletons representing different widget formats and environments, where the environments can include specific operating systems, browsers, platforms such as client-based applications and server-based applications, and various devices. These skeletons may be used when generating a requested widget to adapt the widget being generated with the environment from which the request was generated. In so doing, a user may identify or select parameters and content of a widget and can then rely on the WAA to conform the selected parameters and content to a specific environment when the widget is later generated at request time. Embodiments can provide for creating, editing, or customizing widgets in a manner that provides for flexible generation of the widget, and flexible execution of the widget, on numerous platforms and in numerous applications. Further examples of the various environments for which widgets may be generated by the WAA include: mobile platforms, server platforms, personal computer platforms, different HTML browsers, and other platforms with particular rendering demands or aspects.

For example, web widgets may need to be deployed to dissimilar target environments, such as a web page, mobile device, or desktop, with each environment running related but meaningfully different operating systems or widget runtime environments. In embodiments, dynamic widget generation may be provided such that widgets may be specialized at run time to instantiate on a plurality of devices or operating systems, including network servers, smaller resolution mobile devices, and individual client platforms. Embodiments may facilitate this flexibility through skeletal framework that target specific environments, by supporting resizing operators, by inserting sub-widgets into a container widget compatible with a certain target environment, and with other pre-generation, generation, and post-generation methodologies as well. Still further, eventing constructs, which can include environmental skeletons, may also be employed in embodiments. These can include template syntax that dynamically inserts widget property values into generated widgets and dynamically performs recursive calculations to generate and output a usable or finished web widget.

To promote flexibility and reuse, widget templates embodying the invention may use recursive eye-catcher syntax with support for functions that include embedding components, math operations, internationalization, iterations, conditional tests, and sub-widget insertion. Shareable and reusable code may also be used. This shareable or reusable code may facilitate, among other things, global widget settings that need not be duplicated in numerous locations for use in different environments. In embodiments, these global settings may be changed in a single location but have broader implications.

In embodiments, arithmetic calculations may also be used such that global resizing can serve to appropriately resize regions within a widget or conform a widget to a known constant. Embodiments may also employ dynamic language translation for internationalization requirements and for the iterative insertion of one widget within another. This iterative insertion may include, as an example, inserting sub-widgets within a parent container widget, and displaying or organizing these insertions through the use of tabs that designate sub-widgets in each tab pane.

FIG. 1 shows features of processes as may be employed in accord with embodiments. The features described in FIG. 1 as well as elsewhere in the application may be performed as described, may be altered, may be performed with additional steps or features, and in the same or modified ways. Still further, they may also be performed in various orders, and with or without additional features or modifications.

As can be seen in FIG. 1, a Widget Assembly Application may be instantiated for use. The WAA may include reusable widget components, may enable selectable, customizable properties, and may include editors for those properties. As shown at 110, the WAA may be employed to create or edit templates that may be later used for assembling widgets or generating them for use across multiple environments. These templates may be created by a programmer or administrator of the WAA. As shown at 120, the WAA may store multiple templates such they may be used later on, when deploying widgets in various environments. These templates may be used by the WAA when a user assembles and edits a widget. The template may be further employed when the widget is generated. Environment skeletons, discussed herein, may also be used by the WAA when widgets are generated. When widgets are generated and deployed, as shown at 130, target sensitive architecture, event constructs, or both may be used when deploying to the requesting environment. This architecture and eventing constructs may provide the widgets with functionality that can interact with the widgets subsequent environment as well as with other widgets. Moreover, WAR files may or may not be manually deployed in conjunction with the use of the eventing constructs.

Thus, in embodiments, a template may be considered to be a generalization of a widget that a user selects as the starting point for his or her customization activities. In embodiments, templates may be created and edited by developers and administrators for later use by end users. In an embodiment, as shown in FIG. 1, the user may instantiate a WAA, select a template, customize a new widget instance based on that template, and save the new widget instance into the catalog. In embodiments, as a result of this step, the widget may be deployed and displayed on various platforms. Later, once the widget has been deployed, when a user requests that the widget be displayed, a request, containing metadata identifying the target type, may be made from the target platform to a generator.

Figure 2:
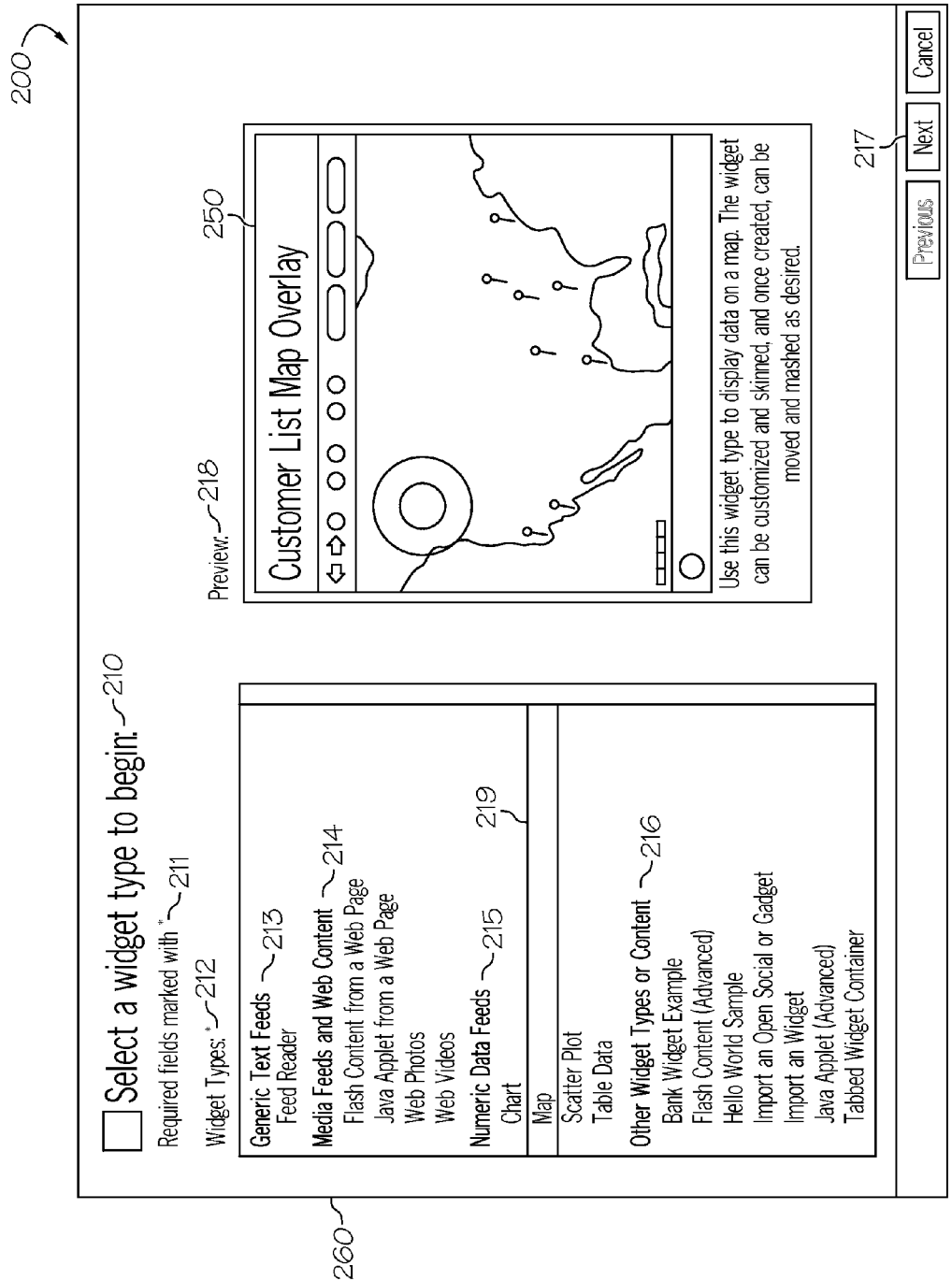
FIG. 2 shows user interface elements as may be employed in accord with embodiments.

FIG. 2 shows a graphical interface of a Widget Assembly Application 200 as may be rendered in a window of a client desktop environment. This WAA 200 may be rendered on a thin client, remote from a server, and it may also be run locally at a particular client location. In either event, an administrator may facilitate the interface parameters of the WAA 200 as well as the various menus and options for widget creation, assembly, editing, and generation that the WAA 200 may provide. The administrator may manage the WAA remotely as well as locally.

Visible in FIG. 2 are page title instructions 210, user instructions 211, scroll box 212, template menu 260, template categories 213, 214, 215, and 216, preview indicator 218, widget preview display 250, and advance/retreat buttons 217. As can also be seen in FIG. 2, highlighted selection 219 has been rendered in the preview widget display 250. In use, once the WAA has been instantiated on a client system, a user may select between various templates organized by. These categories can indicate the functionality of a collection of widget types: such as the type of content acceptable to the widget, such as textual or numeric feeds, existing web content such as a Java applet or Flash movie, or existing widgets; the type of display used to render the content: such as charts, maps, scatter plots, photo gallery, etc. In use a user may select from the menu 260 to first select a widget type, and may then select from various drop down options for the widget type. Remote, existing widgets may also be offered through these drop-down menus. These existing widgets may be of various types and may be imported from iWidget, OpenSocial or Google Gadget, as well as from other content sources.

Thus, in embodiments, if a template entry is selected by a user, the user may then customize that template entry using the WAA. These editors may be displayed in menus of the WAA where a given editor may be made up of a collection of controls that manipulate eye catchers stored within the template, thus allowing the new widget to be customized and later stored.

Figure 3:
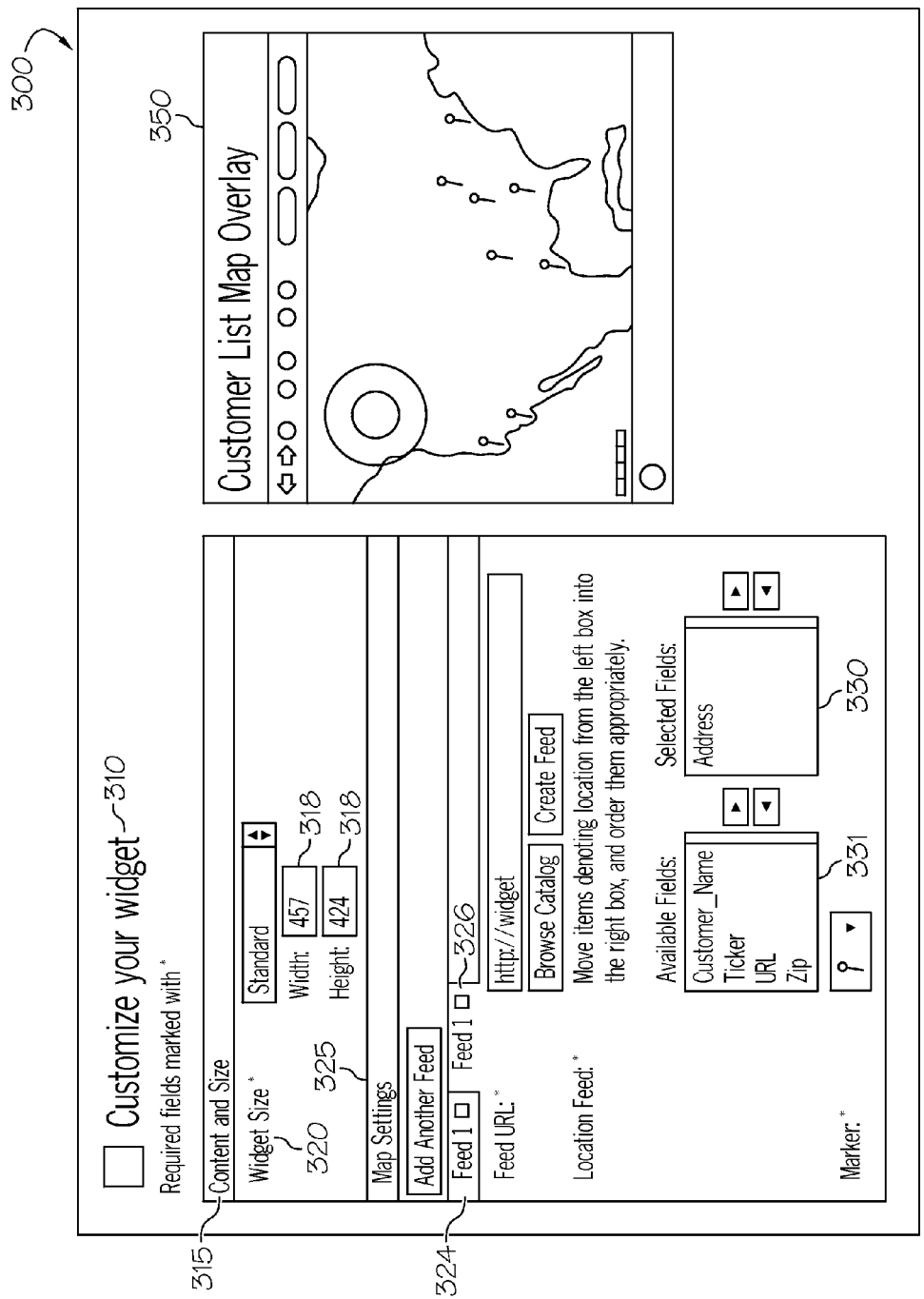
FIG. 3 shows user interface elements as may be employed in accord with embodiments.

FIG. 3 shows a Widget Assembly Application 300 much like the WAA 200 shown in FIG. 2. The WAA 300 in FIG. 3 is displaying different editor options for the user. Visible in FIG. 3 are the editor page tab 310, customization editor heading 315, contents tabs 324 and 326, and a widget preview window 350. Also visible are toggle address fields 331 and 330.

In the embodiment of FIG. 3, as can be seen, the user may make precise adjustments to parameters for a widget being edited and created. These can include the size of the widget, specific URLs to feeds that would be rendered within the widget, specific fields defining how data in the feeds are to be rendered, specific fields for placement within the widget, and other changes as well. As with the embodiment of FIG. 2, the embodiment of FIG. 3 has the preview window 350, which allows the user to track and monitor his or her work. As the widget is created, the underlying parameters, representing the user's selections, may be stored in conjunction with the underlying template selected used by the user in FIG. 2. The parameters may also be stored without the templates and called upon or referenced later on, in conjunction with the template and any required skeleton, to generate and instantiate a requested widget.

The data forms in embodiments may be used to populate the widget and for real-time updates once the widget is generated and instantiated on a platform. The preview display can show a user the progress he or she is making with regard to their assembly and editing work. Once the user has created and saved the parameters for a widget, a target destination may also be selected by the user. This target destination may then be used to associate the widget parameters with a skeleton directed to the target destination. The widget parameters and the environment skeleton may be used later on by the WAA or other application to generate and instantiate a widget at a target or requesting location.

In the embodiments of FIGS. 2 and 3, as noted, remote content may be available and used when assembling the widgets. This remotely hosted content may be further augmented with features such as the enablement of widget statistics tracking and monitoring as well as the insertion of an "Add To" redeployment button. With or without this augmentation, the reworked remotely hosted content may be accessed via a widget deployed to a plurality of platform types using the WAA and the techniques and approaches described herein.

When the "Add To" feature is enabled to facilitate the remote deployment of widgets, created widgets may be deployed to a container/runtime/operating system of a certain type. From that container the end user may "Add To" or redeploy the widget to yet another container of the same or different type. By employing this feature, end users may be permitted to import content, with or without concern for type, and redeploy the content where it is most useful to the user. This redeployment may include mashing it with other widgets or content that may or may not be of the same format and redeploying the widget to other locations, without, for example, requiring an administrator to manually deploy a WAR file to a server.

When completed, the "Add To" button, when clicked, may present another dialogue box with a drop down menu that identifies where the widget may be placed. These placement target environments can include mashup canvases, Facebook®, Googlewave™, Apple® desktop, a personal webpage, as well as any other widget container for which a skeleton has been defined. In addition to or instead of a drop down menu, sweep/select operations can also be used to place the new widget on a non-identified target environment. Other techniques for placing the widget may be used as well.

As noted, the WAA may also be employed in other applications. If added to a mashup canvas, a widget being edited may be further incorporated into a mashup of other widgets. This mashup may be facilitated by associating widget events in order to produce and/or consume data within the mashup. Wrapping code may be used to manage widget events and payload types between the platforms so that events exposed by a widget may be represented as if they are native to that platform.

Figure 4:
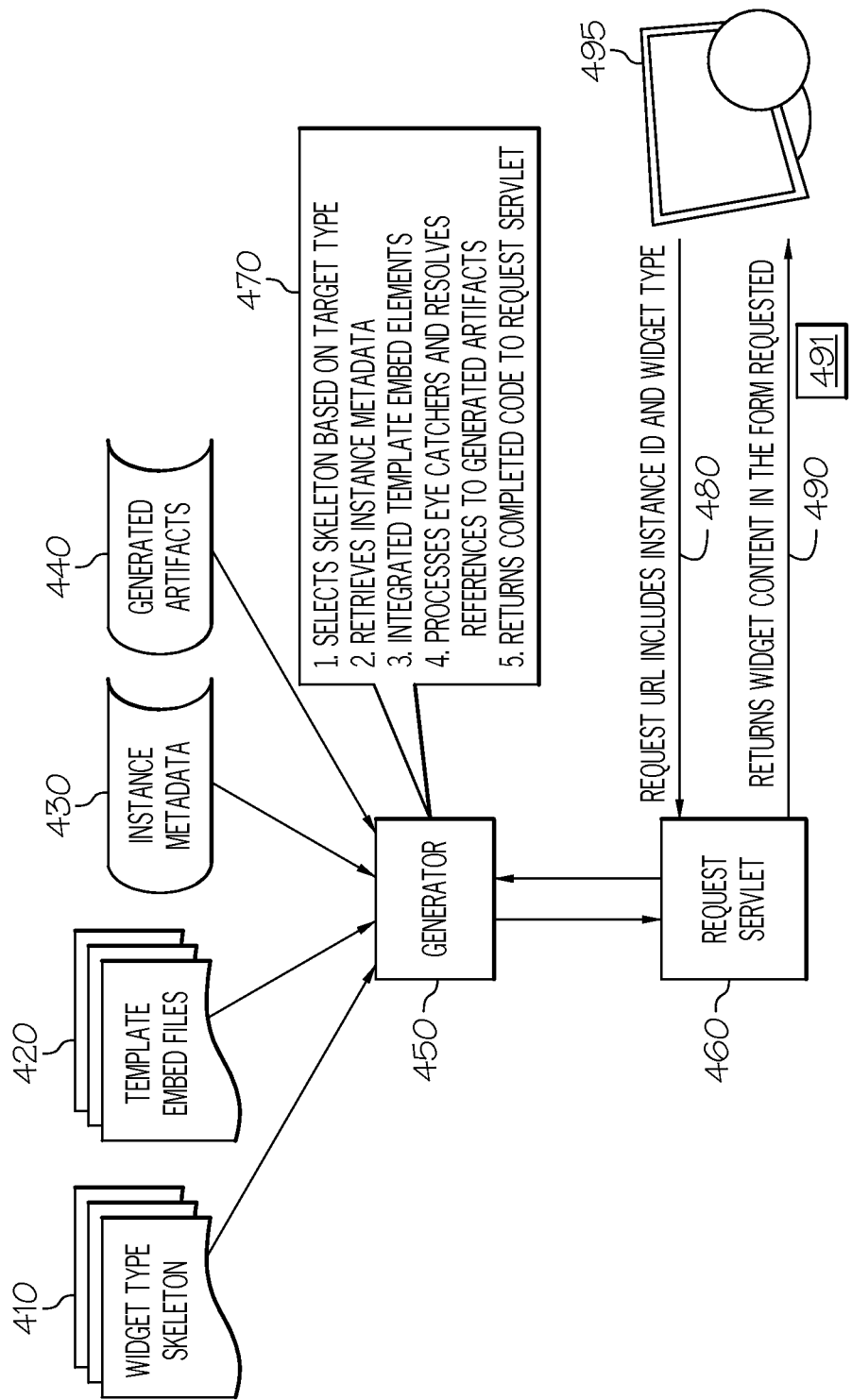
FIG. 4 shows exemplary inputs and flow of widget generation as may be employed in accord with embodiments.

FIG. 4 shows inputs, outputs, and connections to and from a generator 450 as may be employed in embodiments. As can be seen in FIG. 4, the generator 450 may be receiving inputs from a widget type skeleton 410, template embedded files 420, instance metadata 430, and generated artifacts 440. These files and data may be used by the generator 450 in response to a request servlet 462 request to generate a widget. Upon gathering the needed files and data, the generator 450 may generate a widget with content in the form requested. The further return of this content to the requesting client is shown at 490 and 491.

In embodiments, a client 495 may make a request for a URL that includes an instance ID and widget type. This request, traveling from the client to the request servlet, is shown at 480. This request may be handled by request servlet 460, which may, in-turn send the request to generator 450 to satisfy. Upon receiving the request, the generator 450, as shown at 470, may select the appropriate widget skeleton based on the target type. In other words, a skeleton in the WAA may be chosen based on the operating system running on the client 495, the type of client 495, or other parameter with which the skeleton is configured to support. The skeletal variables and associated JavaScript of 410 and other embodiments can include attributes and limits for those targets.

Upon receiving the request, the generator may also retrieve instance metadata, which may be specific to the widget being generated. This metadata may be specifically selected by a user previously in the WAA and can include graphical interface elements of a widget as well as other user selected options. Perhaps using the instance metadata 430, generator 450 may then, in conjunction with the widget and 410, integrate template embedded elements. These template embedded elements may be elements that are reproduced across various types of widgets or various platforms and can be easily updated by an administrator such that a user using the editor may not need to be advised of these template embedded files.

Upon receiving the request, the generator may also process eye-catcher code and resolve references to generated artifacts associated with a specific widget template or user edited or created files. After considering or discounting each: the widget type 410, the template embedded files 420, the instance metadata 430, and the generated artifacts 440, the generator 450, may return the completed code to the request servlet 460, so that the request servlet 460, may return widget content in the form requested to the client 495. This widget content, as shown at 490, may then be rendered at the client as a web widget, desktop widget, or other type of widget. Still further, transforms may be used to move data from internet or desktop to the widget. These transforms may be further used to allow materials to be moved from the web, to desktop, to mobile devices. Other transforms may be used as well.

In embodiments such as those addressed in FIG. 4, eventing constructs may be built into skeletons as associated artifacts. In so doing, once a generated widget is deployed to a target location, including a mashup canvas, the widget may interact with other widgets as part of the mashup. This interaction may include wiring widget events in order to produce and/or consume data within the mashup. In these and other embodiments, because of the eventing constructs, a WAA user may not be required to write code or exhibit specialized knowledge in order to create the widget instance or the mashup.

In FIG. 4, as well as in other embodiments, skeletons that represent different types of targets (e.g., OpenSocial containers, Google Gadget containers, Facebook, iWidget containers such as WebSphere Portal and IBM Mashup Center, Apple Dashboard, iOS 4, Adobe AIR, etc.) may be queried and returned to a generator for use in generating the widget. This skeleton may be used with metadata storing generics and related artifacts to generate a widget for a specifically identified platform. The skeleton here, as well as in other embodiments, may be an outline that allows a widget to be generated for a specific platform, i.e. to be generated in a form that is known to work for a specific platform.

Figure 7:
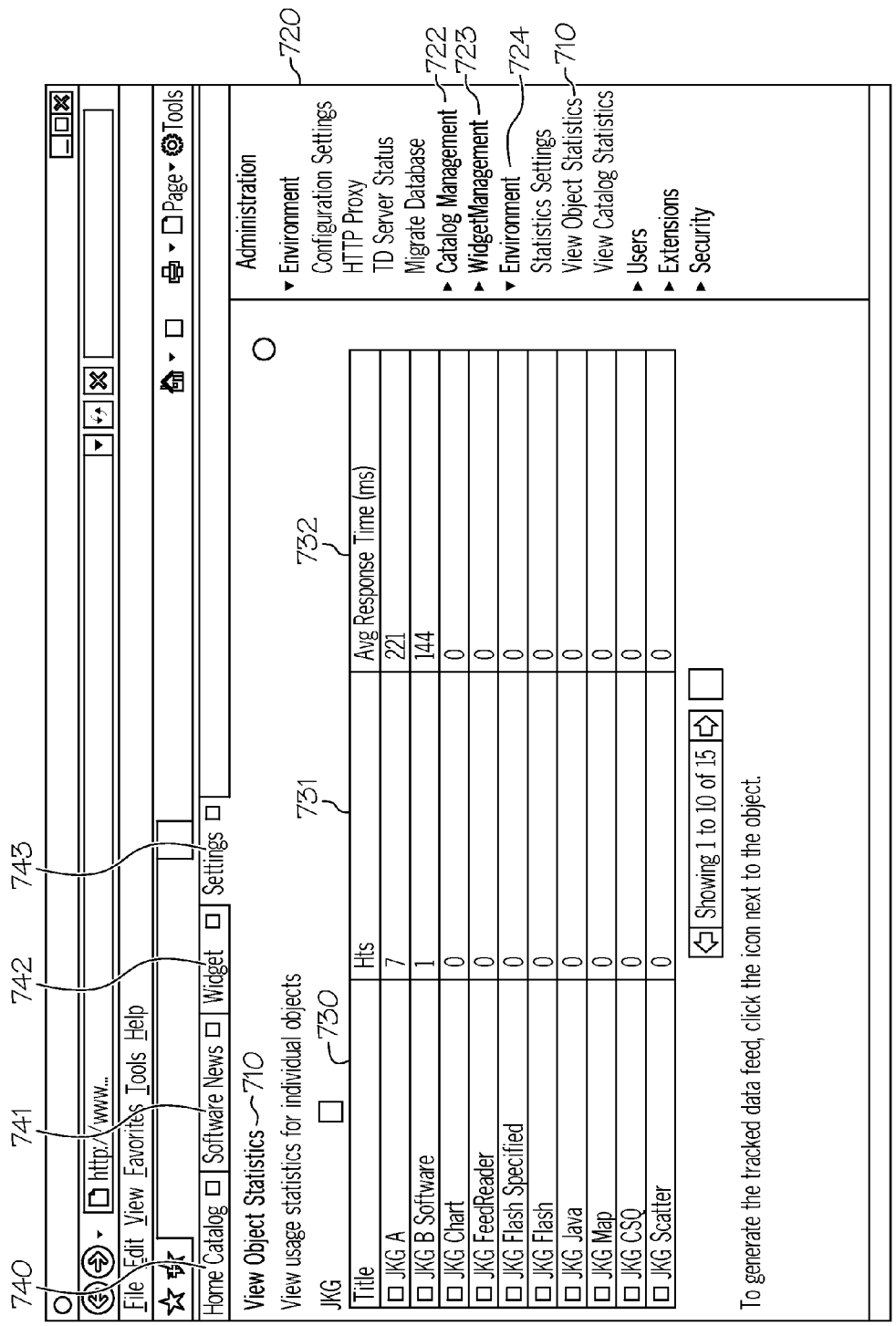
FIG. 7 shows setting and tracking functionality of a widget assembly application as may be employed in accord with embodiments.

In embodiments, metrics for tracking widgets can also be gathered, organized and used for generated widgets. These can include metrics identifying where, how often, and when a widget is used. Load balancing or other decisions can be predicated, at least in part, on this widget information. FIG. 7 shows further specifics of exemplary widget tracking.

Code underlying the templates and the WAA may employ eye-catchers. These eye-catchers may be processed in a recursive fashion when the widget is generated. These eye-catchers can include visual clues in software that indicates that processing should occur. Double-braces in the following example exemplify recursive eye-catchers:
{{$CONSTANT}} may be replaced with a constant value, such as the MHUB_BASEURL or a system defined value such as ENTRY ID or PREFIX
{{=property}} may be replaced with a widget property value
{{/embed/filename}} may be replaced with the contents of a file with the given path {{+(−9)
({{=height}})}} can be used to calculate offsets and returns an integer {{* (0.5)
({{=width}})}} can be used to calculate multipliers and returns an integer
{{:{{=objectId}}:/embed/{{=template}}/body_component}} can be used to embed components with another widget's properties {
{|prefix|body_component.xml}} can be used to insert a subwidget in a complex widget
{{#prefix<0>_,numPrefixes,subInitcall_component.js, makeUniqueBoolean,inheritPa rentBoolean}} can be used to iterate over a set of prefixes from <0> to numPrefixes
{{? BOOLEAN_EVAL ? TRUE_CONDITION: FALSE_CONDITION}} can be used for if-conditional calculations
{{~labels.property}} is replaced with an internationalized string for the given property.

A typical hello-world widget's body component might look like:

```
<div id="{{$WID}}body" role="main" >
  <div style='height: {{+ (−125) ({{=height}}) }}px; color: {{=textColor}};'>
    <span style='{{=titleStyle}}'>{{=title}}</span><br/>
    <br/>
    <span style='{{=captionStyle}}'>{{=caption}}</span><br/>
  </div>
</div>
```

In an example of code component reuse, the hello-world widget may contain a header component and a footer component that implements a widget design style. A feed reader template might reuse the exact same header and footer components, but replace the body component with one specific to the feed reader widget. The header and footer components could be included by using an embedded eye-catcher syntax.

Figure 5:
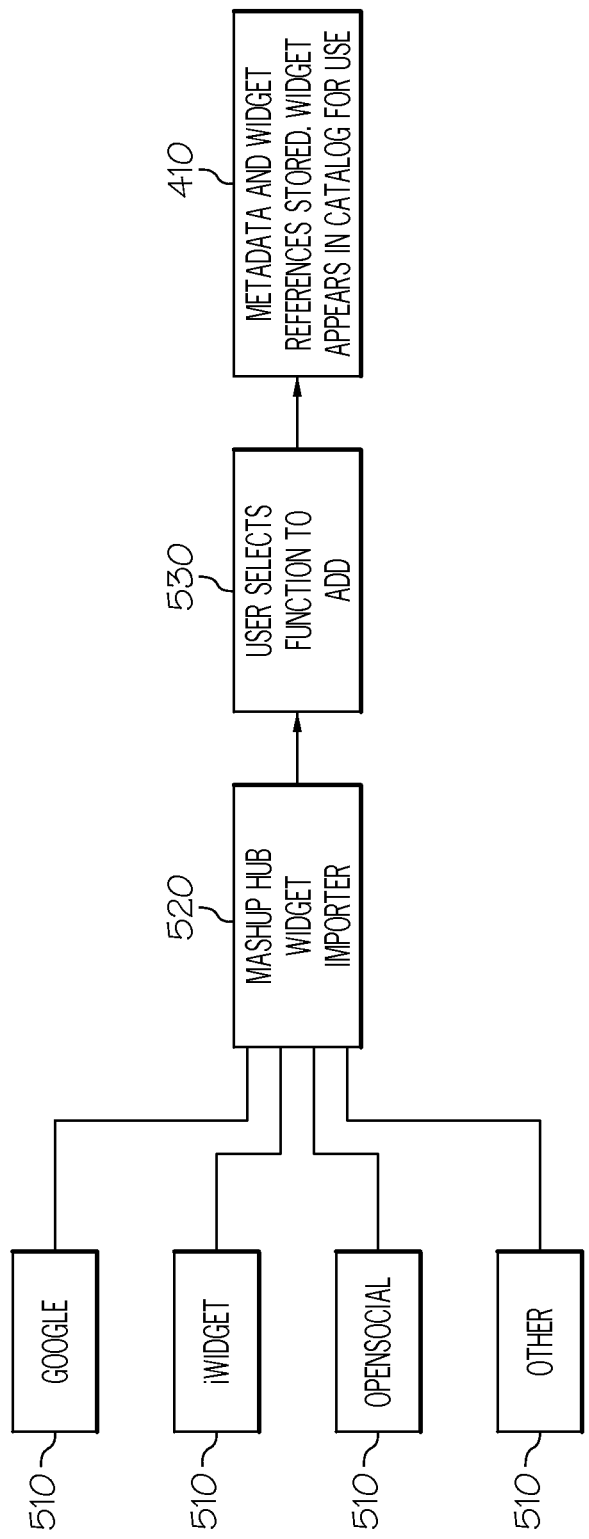
FIG. 5 shows exemplary inputs and flow of widget importation and wrapping as may be employed in accord with embodiments.

In an example of target resizing and eye-catcher recursion, a simple calculation to set the width to fit into an iPhone® might be implemented as:
    width: {{? {{$IS_IPHONE}}? {{$IPHONE_DEFAULT-APP_WIDTH}}
    ({{=width}}}}px;

FIG. 5 shows embodiments employing importation of remotely hosted content, including widgets, that can be supplemented with features and then redeployed using the skeleton, template, and generator discussed herein. Embodiments may employ wrappers or other functionality so as to allow the reuse of existing content and widgets. The supplementation can include adding tracking or monitoring functionality as well as making the widget or other content more deployable with the addition of "Add To" functionality.

As noted, this "Add To" functionality may allow the user to insert the imported content or widget into a target destination by toggling an "Add To" button or other designate. The "Add To" functionality may allow an end user to redeploy the widget or content to another target of the same or different type. In embodiments, a user may, therefore, import content of varying types, redeploy the content to targets most useful to the user, mash the content with other content or other widgets, and redeploy the revised and transformed content to another target. In embodiments this may be done with or without requiring that an administrator manually deploy a related web application archive file.

In embodiments, a user may use the WAA to select an existing widget template 510 in order to import a specific widget type. The selection may be made by entering a specific URL location of the widget to import as well as by other selection and identifying techniques. In embodiments, a Mashup Hub widget importer 520 or other widget importer functionality that is part of the WAA may be used for performing the importation. These widget importers as well as other techniques may employ drop down menus of servers and widgets that may be imported from those servers. Here, once the server is selected, the user may be presented with a list of widgets hosted by that server and that can be selected for use. The user may also select the function to add 530 from the selected widgets. Once selected and modified, the widget and its modifying metadata may be stored and catalogued for use as shown at 540.

Wrapping code may be used on imported content and widgets. The wrapping code may interact with known existing widgets. This interaction may include inspecting widget user properties, including user preferences, and exposing the identified values as event types that may be received by a gadget so that it can interact with its environment. The wrapping code may further serve to publish aspects of the widget or content and enable other widgets to communicate with the wrapped widget.

Still further, the wrapping code may function as a logical adapter or container and may be used for persisting a gadget in a foreign environment. In embodiments, a generator may customize the wrapper for the widget and the particular environment. These wrappers may accommodate inputs and outputs for the specific environment. A widget in these wrappers may be inspected or introspected and its properties may be externally visible via an API so that the widget can interact with the environment and so that other widgets can interact with it through environment. User preferences of a Google gadget are examples of properties that can be introspected by the wrapper. XML may also be introspected where each attribute can be made available so that other widgets in the environment can modify them. In so doing, embodiments can be provided to the gadget being introspected to promote change in its state. As an example, known gadgets may become interactive even though they were not interactive before their use in a wrapper. The wrappers may also serve to make known gadgets compatible with environments that the gadgets were not previously compatible with.

Figure 6:
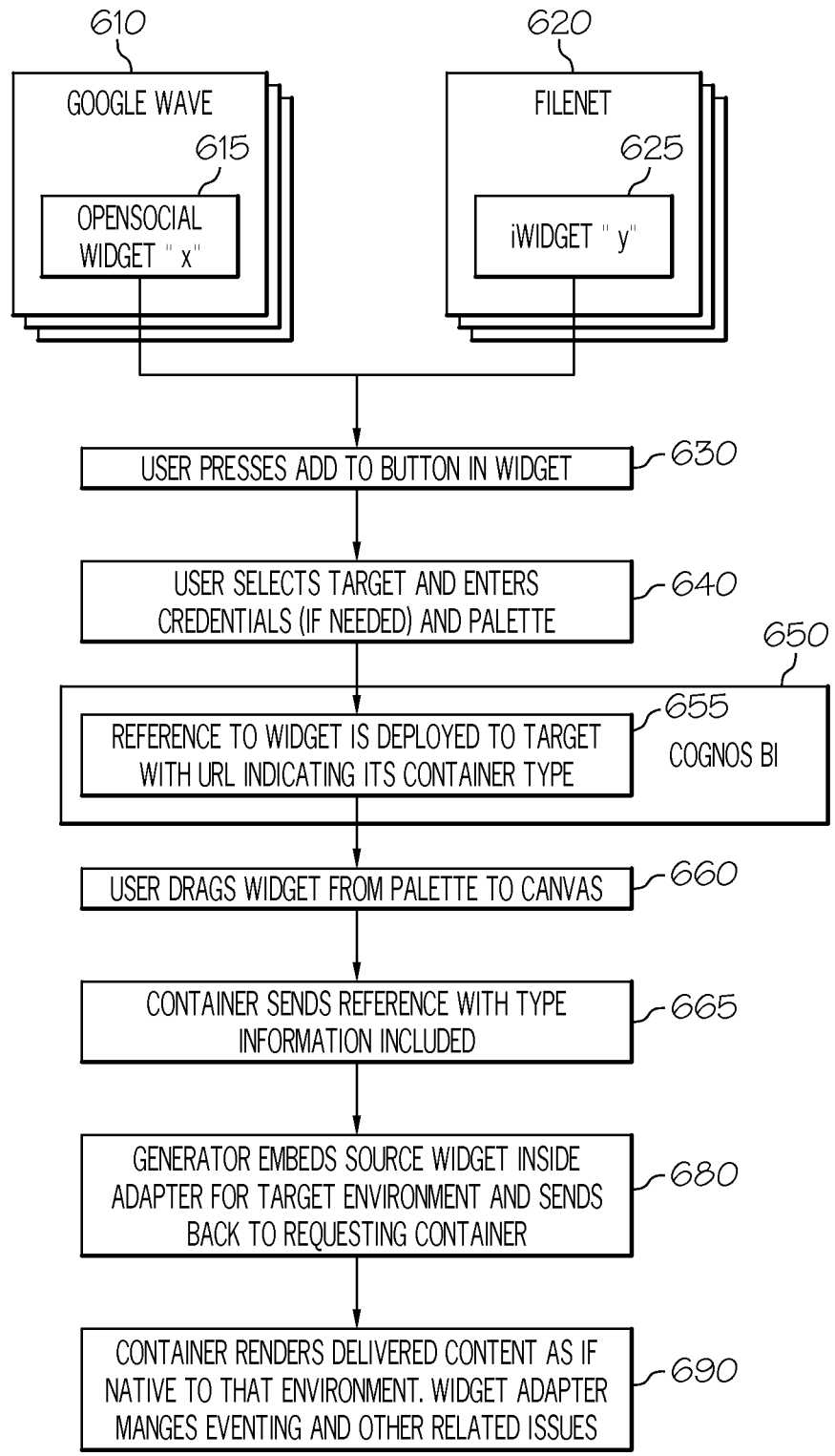
FIG. 6 shows exemplary inputs and flow of widget wrapping and modification as may be employed in accord with embodiments.

FIG. 6 shows processes or actions that may be employed by which a widget may be redeployed or copied or otherwise manipulated from any given source location to any available target. In so doing, embodiments may provide that a generated widget currently deployed and instantiated on a process such as Google Wave may use this process to make a copy of it available for use in, for example, WebSphere Portal. The reverse may apply as well.

In FIG. 6, Widget sources 610 and 620 may contain widgets 615 and 625 that have been previously catalogued for use as described in conjunction with FIG. 5 and elsewhere in the application. As shown at 630, a user may select the "Add To" button in the widget editor to add the OpenSocial widget X or iWidget Y to a target location. The user may select the target to which both widgets may be sent. This selection may include entering credentials to verify the user or the target. This verification is shown at 640. As shown at 655, a reference to the widget may then be deployed to the identified target with the URL indicating the container type. A user may then drag the widget from the palette to a mashup canvas as shown at 660 and the container may then send reference information with widget type information included. A generator, like the one shown in FIG. 4, may embed the source widget inside of an adapter for the target environment and may send back information to the requesting container, as shown at 680. Having been generated and built, the container may render and deliver content, as if it was native to the environment. Also, the widget adapter may manage eventing or other related issues, as shown at 690. Other steps and features, as well as modified features, may also be employed when using imported widgets in the WAA.

FIG. 7 shows setting and tracking functionality of a Widget Assembly Application in accord with embodiments. The WAA in this embodiment as well as others may be server based, locally based, or provided over a network using various methodologies as well. As can be seen the WAA includes various page tabs 740, 741, 742, and 743. Also visible in this WAA are: an administrator sidebar 720; administrator menus 721, 722, 723, and 724; and user widget content 730, 731, and 732. As with other embodiments, the WAA of FIG. 7 may contain multiple tabs providing various options for the editing and management of widget creation. Editing and management may be conducted by programmers, administrators, and end user in this embodiment as well as in others. As noted above, widget templates may be created by programmers and added to the WAA, administrators may set ranges and features that are available for specific end users and categories of end users and end users may use the WAA to create and edit widgets for ultimate application.

As can be seen in FIG. 7, an administrative sidebar 720 may be displayed in embodiments. The display of this sidebar may be limited to administrative users, may be displayed for end users, and may be displayed in other manners as well. These administrator toolbar settings may be used to control the specific widget editor rendered for a user as well as network-based settings, with which the administrator is authorized to modify. The administration sidebar may be used for other administrative purposes as well.

In embodiments, the tools available in the administrative sidebar can include environmental tools 721, catalog management tools 722, widget management tools 723, environmental tracking tools, user tools, extension tools, template tools, skeleton tools, and security tools. When one of these tools is selected, the WAA may display the appropriate information for the administrator to use and refer too. For example, in FIG. 7, view object statistics 710 from the environment tool 724, has been selected. As can be seen this tool includes and view usage statistics for individual objects. Individual objects are listed in column 730, while related hits are listed in column 731 and related average response times are listed in column 732. Tracking information can include various other metrics as may be required or may be of interest for tracking.

Figure 8:
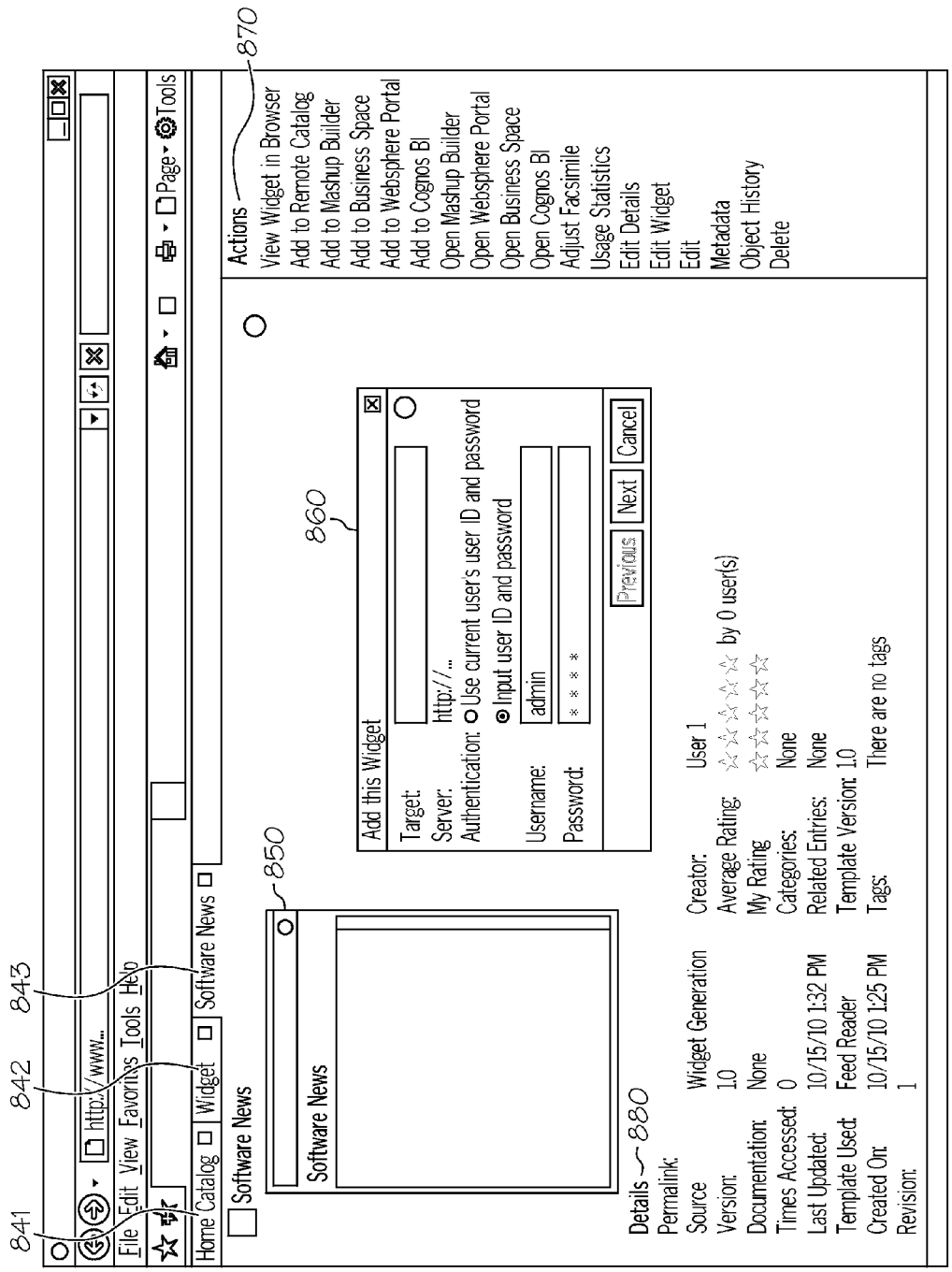
FIG. 8 shows import and mashup activities of a widget assembly application as may be employed in accord with embodiments.

FIG. 8 shows a Widget Assembly Application as may be employed by an end user in accord with embodiments. The WAA in FIG. 8 is shown as it may be used when deploying newly created or existing widgets to one or more remote locations.

Various features and aspects of the WAA are visible in FIG. 8. These include the personalized sidebar toolbar 870, and page tabs 841, 842, and 843. Also visible in FIG. 8 are the preview widget display 850, the deployment process window 860, and widget details 880. In this embodiment, in addition to previewing the final rendered widget in real-time, other tracking information for the widget may also be provided. This other tracking information can include details directed to feedback from previous users of the widget, average widget rating, a user's own rating, the category of the widget, and related widget categories. More fundamental data regarding the widget, i.e., widget metadata, may also be displayed. This fundamental data can include the last time the widget was updated and when it was created. The import verification window 860 may be used by an end user as well as an administrator. Administrators may provide limited and full access to users. In other words, an administrator may limit sources from which widgets may be imported, even if specific correct URLs are identified by a user. This importation block may be for security reasons and for other reasons as well. Similarly, WAAs may require administrative approval for the importation of certain widgets or content.

In addition to editing and creating, the "Add To" window 860 may also allow a user to deploy this widget to one or more remote locations. If the user knows the URL to the remote location, they can simply enter that URL into an input field, which will then use the credentials provided to authenticate with the specified remote location and retrieve an enumerated list of locations within the remote location where the widget may be placed. Otherwise, the user may select from a list of servers that have been preconfigured by an administrator to receive new widgets. Once a server is selected, the user may then be presented with a list of locations where the widget may be placed on that server and can select a location from that list. Once the location is specified, the widget is then deployed to the remote server in the location specified. The deployed widget may then be deployed again to other remote locations.

Figure 9:
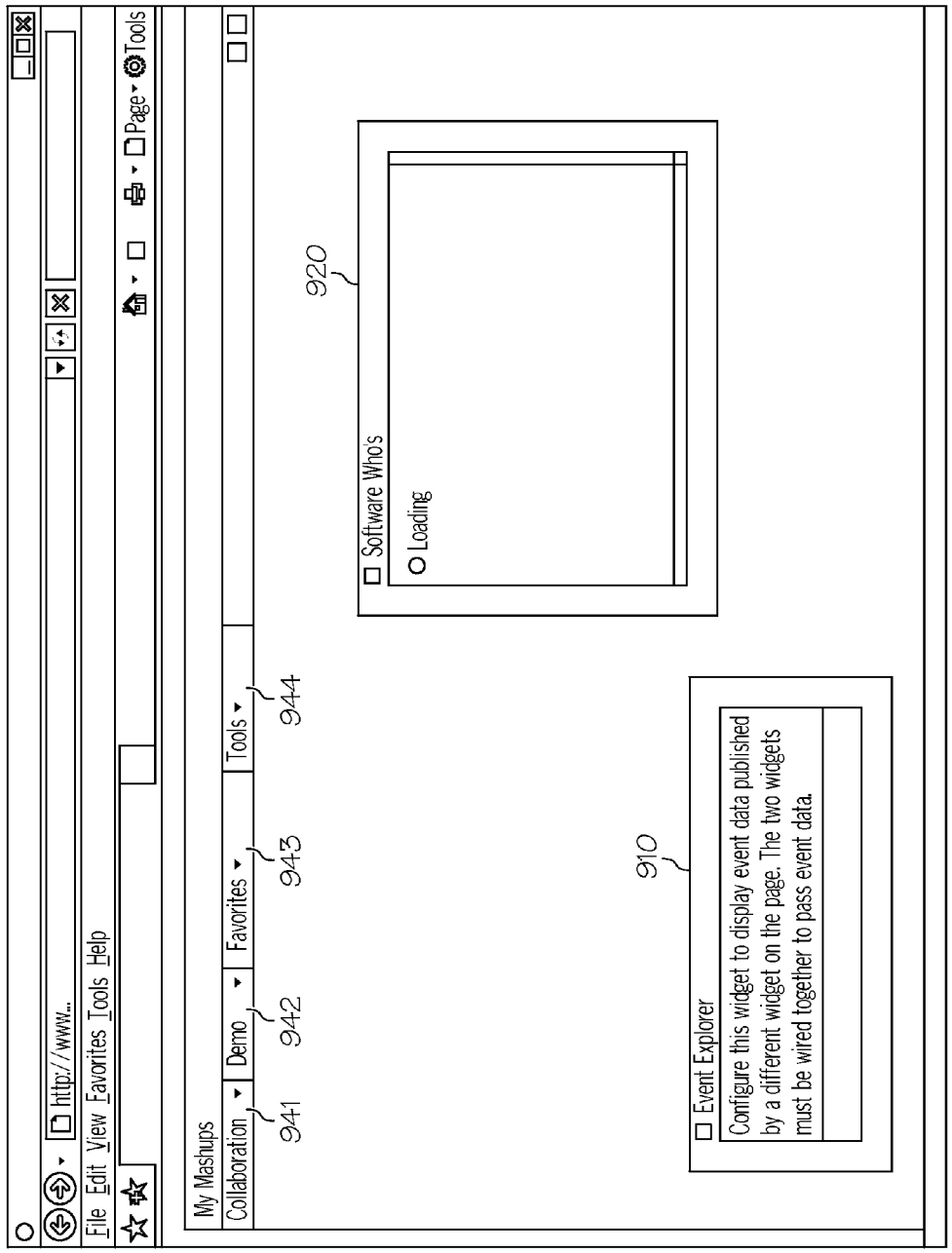
FIG. 9 shows widget creation in a mashup environment in accord with embodiments.

FIG. 9 shows widget creation as it may be employed in a mashup environment. Linked widgets may be previewed in these or other embodiments. This linking may be accomplished using the containers or wrappers discussed herein. Thus, previously incompatible or isolated widgets may be mashed and used in ways not previously employed or implemented.

As can be seen in FIG. 9, embodiments of widgets created using the Widget Assembly Application may be used as part of a mashup editor in a mashup environment. The mashup editor in this environment may include editor page tabs and preview windows that invoke, reference or display aspects of the widgets. The editor page tabs in this embodiment include collaboration 941, demonstration 942, favorites 943, and common tools 944. These tabs may trigger drop menus for an administrator or end user to edit and mash widgets in the mashup editor. Two widgets are displayed in FIG. 9. The widget 920 may have been previously deployed and rendered in accord with embodiments. Likewise the widget 910 may also have been produced or rendered in accord with embodiments. Now, in the mashup editor, the two widgets 910 and 920 may be linked or otherwise associated or combined, i.e. mashed, such that they may communicate and present improved or new material as a result of the mashing. These mashed widgets may further communicate with other widgets in their deployed environments as well as with other content.

In embodiments, web widgets may also be imported and even wrapped such that a user can optionally extend or supplement the web widget with added functionality. This functionality can include metering, monitoring, etc. Also, the added functionality may be associated with the widget using metadata that can be used during subsequent generation for selected target platforms or for all generated platforms.

Thus, in embodiments, a widget editor may be used to customize and save the widget template that may be later used to generate a widget for a requesting platform consistent with architecture or event in constructs or both for that requesting platform. In so doing, embodiments can provide a user to create or edit a widget usable across multiple platforms. As described herein, these platforms may be identified during the creation of the widget template or may be later identified during subsequent editing events.

Embodiments may employ skeletons constructed to adapt widget templates for specific platforms or architectures. Skeletons can serve to personalize, adapt, and customize, widgets for specific platforms or environments. Skeletons may provide for broad adaptation of widget templates, such as enabling certain limited rendering devices such as mobile phones or other handheld devices with small screens. Likewise, skeletons may also serve to enable certain operating platforms or operating systems used across different devices, such as UNIX, or other operating code. Still further, skeletons may be also used in conjunction with or to create containers within which widget templates may be instantiated to facilitate the use of that widget's interaction with other applications running in an environment. Skeleton may be used for other purposes as well.

Figure 10:
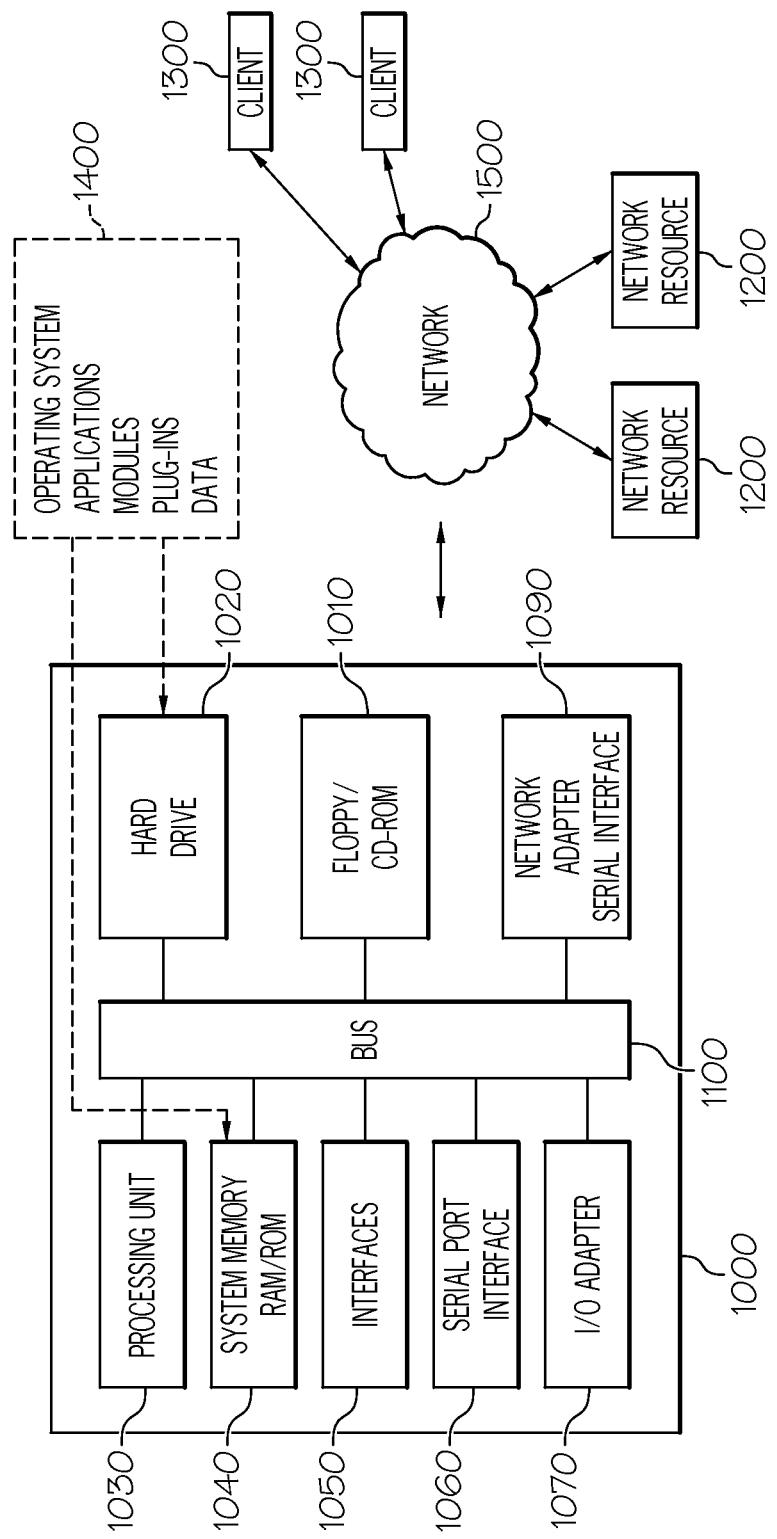
FIG. 10 shows a computer and network as may be employed for widget assembly in accord with embodiments.

FIG. 10 shows a network environment as may be employed in accord with embodiments. Visible in FIG. 10 are client/server 1000, network 1500, network resources 1200, and clients 1300. As can be seen, the server, clients, and resources are connected via the network 1500. This network 1550 may be a local network, a wide-area network, the Internet, the world-wide-web, as well as other types of networks. The client/server 1000 may be configured to carryout embodiments of the invention. These embodiments may be carried out as a client or server. In other words, Widget Assembly Applications may be executed on a server and accessed by a client. Widget Assembly Applications may also be run and used at a stand-alone client and in other ways as well.

The client/server 1000 of FIG. 10 includes a processing unit 1030, system memory 1040, interfaces 1050, a serial port interface 1060, an I/O adapter 1070, a bus 1100, a hard drive 1020, floppy CD-ROM 1010, and a network adapter/serial interface 1090. Each of the components of the client/server 1000 may be in communication with each other through the bus 1100. The hard drive 1020, as well as system memory 1040 may each store instructions 1400, which when followed, configure the processing unit to enable a Widget Assembly Application. These instructions can include operating system applications, modules, plug-ins, and data consistent with embodiments of the invention.

As noted, the network 1500 may be in communication with the client/server 1000 and may also be connected to clients 1300 and network resources 1200. In embodiments, the clients 1300 may be making requests for widget generation by the client/server 1000. because of these requests, and in response to them in embodiments, widgets may be generated and sent back through the network 1500 to the requesting client 1300.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention may be employed with or combined with other applications, including local and cloud based applications. Components of embodiments may consist of JavaScript code and functions, CSS elements, HTML snippets, and other code, each of which may serve to render portions of the widgets. Other elements, such as widget event handlers, may also be used. Moreover, widget components may be written in a shareable manner, such that if a portion of the widget is readily reusable, e.g., can solve a generalized problem, the same component might be reused across various templates.

In embodiments, widget properties may be set as name-value pairs and may serve to define all the widget settings that a user can change. These user selected settings may, however, be overridden if the settings are not appropriate or feasible for a target platform or environment.

What is claimed is:

1. A device comprising:
   a computer readable storage medium storing instructions; and
   a processor in communication with the computer readable medium,
   wherein the instructions, which when executed by the processor, configure the processor to assemble widget content, the content assembly including:
   selecting a widget skeleton from a plurality of different widget skeletons, skeletons of the plurality representing a different type of target widget environment, and skeletons of the plurality for use in generating a widget by adapting a selected widget to work in a specific widget environment, the specific widget environment being an environment targeted by the selected widget skeleton, and
   returning the selected widget environmental skeleton to a widget assembly application for use in generating a widget in the selected widget environment, and
   integrating widget template embedded elements from the widget assembly application into widget content being created,
   wherein the instructions, which when executed by the processor, further configure the processor to return widget content to a requesting servlet, in response to a request for the widget content from the requesting servlet.

2. The device of claim 1 wherein the instructions further instruct the processor to instantiate a widget assembly application, the widget assembly application having drop down menu displays identifying widget content or widget template type for selection by a user of the widget assembly application.

3. The device of claim 2 wherein the widget assembly application includes a widget preview display or wherein the widget environment is specific to one or more of the following: an operating system, a browser platform, a client-based application, a server-based application, a mash-up canvas, or a device.

4. The device of claim 1 wherein the content assembly further includes:
   receiving a network location of widget content and sending a retrieval query to the received network location of the widget content.

5. The device of claim 4 wherein the content assembly further includes:
   introspecting the retrieved widget content and associating the retrieved widget content with a wrapper, the wrapper serving to provide compatibility of the widget content with one or more specific platforms.

6. The device of claim 1 wherein the instructions further instruct the processor to generate eventing constructs for the widget.

7. The device of claim 2 wherein the widget assembly application includes a plurality of widget templates, the widget templates serving as a basis for template types in one or more drop down menus of the widget assembly application.

8. A method for instantiating a widget comprising:
   receiving a query to generate a widget;
   in response to the query,
      retrieving a widget environmental skeleton from a plurality of different widget skeletons,
      skeletons of the plurality each representing a different type of target widget environment before being retrieved and
      skeletons of the plurality for use in generating a widget by adapting a selected widget to work in a specific widget environment, the specific widget environment being an environment targeted by the selected widget skeleton, and returning the selected widget environmental skeleton to a generator for use in generating the widget,
   retrieving instance metadata specific to the widget to be generated, the instance metadata saved from a widget assembly application, generating the widget using the generator, where generating the widget includes using the retrieved widget skeleton as framework for generating a widget;
providing widget content in the form requested in the query to generate the widget using the generator.

9. The method of claim 8 further comprising:
instantiating a widget assembly application, the widget assembly application having menu displays identifying widget content or widget types for selection by a user of the widget assembly application.

10. The method of claim 9 wherein the widget assembly application includes a widget preview display.

11. The method of claim 8 wherein the content assembly further includes:
receiving a network location of widget content and sending a retrieval query to the received network location of the widget content.

12. The method of claim 8 further comprising:
introspecting widget content and associating the widget content with a wrapper, the wrapper serving to provide compatibility of the widget content with one or more specific platforms.

13. The method of claim 8 further comprising:
generating eventing constructs for the widget.

14. The method of claim 9 wherein the widget assembly application includes a plurality of widget templates, the widget templates serving as a basis for template types in one or more menus of the widget assembly application.

15. A device comprising:
a computer readable storage medium storing instructions; and
a processor in communication with the computer readable medium,
wherein the instructions, which when executed by the processor, configure the processor to:
instantiate a widget assembly application,
provide instructions for providing reusable widget components within the widget assembly application,
retrieve a widget environmental skeleton from a plurality of different widget skeletons, skeletons of the plurality representing different types of target widget environments and, skeletons of the plurality for use in generating a widget by adapting the widget to work in a specific widget environment, the specific widget environment being an environment targeted by the selected widget skeleton,
returning the retrieved widget environmental skeleton to a generator for use in generating the widget,
provide instructions for providing customizable widget properties within the widget assembly application,
provide instructions for editing the provided customizable widget properties,
saving received widget customization, including customized widget properties and selected reusable widget components, as a widget template, and
deploying the saved widget template over a network to a remote requestor, the deployed widget template having target sensitive architecture or eventing constructs, and the widget template usable by a generator of the widget to generate the widget.

16. The device of claim 15 wherein the widget assembly application has drop down menu displays identifying widget content or widget types for selection by a user of the widget assembly application.

17. The device of claim 16 wherein the widget assembly application includes a widget preview display.

18. The device of claim 15 wherein the processor is further configured to:
upon receipt of a network location of widget content, send a retrieval query to the received network location of the widget content.

19. The device of claim 15 wherein the processor is further configured to:
introspect retrieved widget content and associate the retrieved widget content with a wrapper, the wrapper serving to provide compatibility of the widget content with one or more specific platforms.

20. The device of claim 16 wherein the widget assembly application includes a plurality of widget templates, the widget templates serving as a basis for template types in one or more drop down menus of the widget assembly application.

21. An article of manufacture comprising:
a nontransitory computer readable storage medium, the storage medium containing instructions therein, the instructions, when executed by a processor, serve to configure the processor to instantiate a widget assembly application, provide instructions for providing reusable widget components within the widget assembly application, retrieve a widget environmental skeleton from a plurality of different widget skeletons, skeletons of the plurality each representing a different type of target widget environment before being selected for use in conjunction with a selected widget, and skeletons of the plurality for use in generating a widget by adapting the widget to work in a specific widget environment, returning the selected widget environmental skeleton to a generator for use in generating the widget, and deploy a saved widget template over a network to a remote requestor, the deployed widget template having target sensitive architecture or eventing constructs, and the widget template usable by a generator of the widget to generate the widget.

* * * * *